United States Patent [19]

Kagawa

[11] Patent Number: 5,458,951
[45] Date of Patent: Oct. 17, 1995

[54] POROUS FILM, METHOD FOR MANUFACTURING THE SAME, GAS PERMEABILITY CONTROL FILM, AND WATER VAPOR PERMEABILITY CONTROL FILM

[75] Inventor: Seiji Kagawa, Kawaguchi-shi, Saitama-ken, Japan

[73] Assignee: Seiji Kagawa, Saitama, Japan

[21] Appl. No.: 226,373

[22] Filed: Apr. 12, 1994

Related U.S. Application Data

[63] Continuation of Ser. No. 888,850, May 27, 1992, abandoned.

[30] Foreign Application Priority Data

May 27, 1991 [JP] Japan ................................ 3-121319
Jan. 13, 1992 [JP] Japan ................................... 4-4154

[51] Int. Cl.⁶ ............................ B29C 65/00; B28B 1/48; B32B 7/12; B32B 27/36
[52] U.S. Cl. ....................... 428/155; 428/332; 428/483; 428/220; 428/156; 264/41; 264/154
[58] Field of Search .................... 428/332, 155, 428/483; 264/41, 154

[56] References Cited

U.S. PATENT DOCUMENTS

| | | | |
|---|---|---|---|
| 3,709,774 | 9/1973 | Kimura et al. | 161/159 |
| 4,250,135 | 2/1981 | Orsini | 264/227 |
| 4,964,992 | 10/1990 | Goldsmith et al. | 210/500 |
| 4,980,100 | 12/1990 | Krishnakuma et al. | 264/154 |
| 5,114,795 | 5/1992 | Perec et al. | 428/483 |

FOREIGN PATENT DOCUMENTS

| | | |
|---|---|---|
| 0124028 | 11/1984 | European Pat. Off. |
| 0392010 | 10/1990 | European Pat. Off. |

Primary Examiner—George F. Lesmes
Assistant Examiner—Kathryne E. Shelborne
Attorney, Agent, or Firm—Nixon & Vanderhye

[57] ABSTRACT

A gas permeability control film having a barrier property against water, bacteria, and viruses, an oxygen gas permeation amount controlled to fall within the range of $10^3$ to $10^7$ cc/m²·24 hours·25° C., and a controlled carbon dioxide gas permeation amount. The gas permeability control film has an organic film in which non-through pores having an average opening width falling within the range of 0.5 μm to 150 μm are formed at a density of 500 to 200,000 pores/cm².

8 Claims, 5 Drawing Sheets

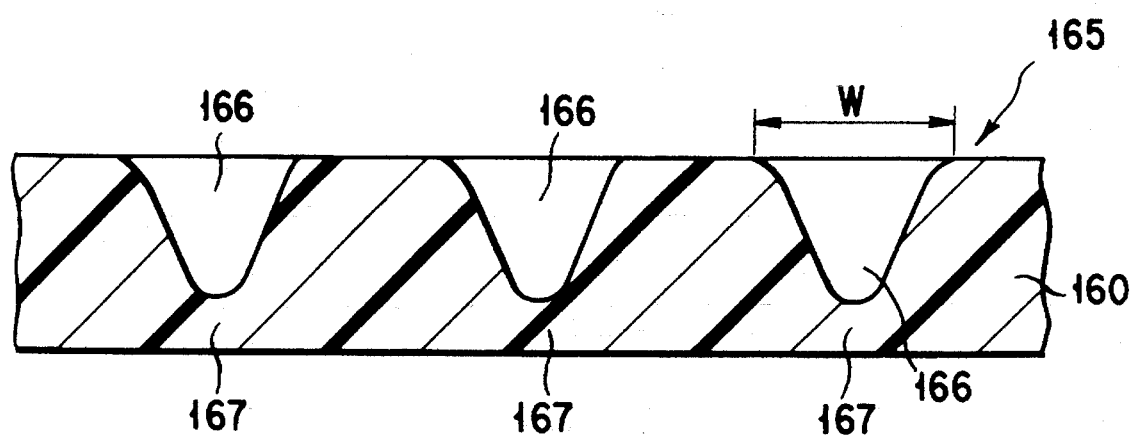
F I G. 5

POROUS FILM, METHOD FOR MANUFACTURING THE SAME, GAS PERMEABILITY CONTROL FILM, AND WATER VAPOR PERMEABILITY CONTROL FILM

This is a continuation of application Ser. No. 07/888,850, filed May 27, 1992, now abandoned.

FIELD OF THE INVENTION

1. Field of the Invention

The present invention relates to a porous film and a method for manufacturing the same and, more particularly, to porous films useful as various functional films such as a gas permeability control film and a water vapor permeability control film, and a method of manufacturing the same.

2. Description of the Related Art

Conventional various porous films serving as various functional films have been developed.

For example, a fine inorganic powder is filled in a general-purpose olefin resin (e.g., polyethylene) in a large amount (generally, 50 vol % or more) and is formed into a film. The film is then uniaxially or biaxially stretched at a high ratio. According to this method, open cells are formed in the interface between the resin and the inorganic powder to form a large number of pores which communicate with each other in the form of a maze, thereby manufacturing a porous polyethylene film. However, since a large amount of inorganic powder is added in the porous film, the essential properties (e.g., strength, softness, and transparency) of a resin constituting a film are considerably deteriorated.

It is known to manufacture a porous thermoplastic resin film by a mechanical perforation method such as a needle punch method or a heat fusion perforation method. In the needle punch method, a thermoplastic resin film (e.g., a polyethylene film) is perforated by pressing heated needles against the film. In the heat fusion perforation method, a thermoplastic resin (e.g., a polyethylene film) is perforated by fusing the film by using a heated embossing roll.

A large number of through pores are formed in the porous thermoplastic resin film formed by a mechanical perforation method. For this reason, the size and number of through pores formed in the porous thermoplastic resin film are adjusted to control the gas permeation amount (e.g., the oxygen gas permeation amount). However, water, bacteria, and viruses also permeate through the through pores of the porous thermoplastic resin film. In addition, since the size of each through pore is as large as about 100 µm, it is difficult to highly accurately control the oxygen gas permeation amount.

SUMMARY OF THE INVENTION

It is an object of the present invention to provide a porous film having a large number of non-through pores, an excellent adhesion strength with coating agents including an ink or various fine powders such as a magnetic powder.

It is another object of the present invention to provide a gas permeability control film in which water, bacteria, and viruses do not permeate, and the oxygen gas permeation amount and the carbon dioxide gas permeation amount can be controlled.

It is still another object of the present invention to provide a water vapor permeability control film in which water, bacteria, and viruses do not permeate, and the water vapor permeation amount can be controlled.

According to the present invention, there is provided a porous film comprising an organic film in which a large number of non-through pores are formed.

Examples of the organic film are: a polyolefin film such as polyethylene film or polypropylene film; a polyester film such as polyethylene terephthalate film; various polymer resin films made of polyvinyl chloride, a fluoroplastic, polyamide, polycarbonate, polyimide, polyether ether ketone, polyether ketone, an elastomer, and polyurethane; various foamed polymer resin films made of foamed polyethylene and foamed polypropylene; foamed paper; a heat-fusible resin film; a multilayered film, i.e., a two- or three-layered film of heterogeneous polymer resin films, such as a two-layered film of a polyethylene terephthalate film and a polyethylene film, and a two-layered film of a polyethylene terephthalate film and a polypropylene film; and other multilayered films such as a multilayered film obtained by stacking woven or unwoven fabric on a polymer resin film, or a multilayered film obtained by stacking paper on a polymer resin film.

The organic film preferably has a thickness falling within the range of 5 µm to 3 mm.

The average opening width of the non-through pores formed in the organic film can be arbitrarily selected in the range of 0.5 to 150 µm in accordance with application purposes of the porous film. The opening widths of the large number of non-through pores are preferably uniform.

The number of non-through pores formed in the organic film is selected to be a density of 500 to 200,000 pores/cm$^2$ in accordance with the opening widths of the non-through pores and application purposes of the porous film. The large number of non-through pores are preferably uniformly dispersed in the organic film.

According to the present invention, there is also provided a method for manufacturing a porous film, comprising the steps of:

arranging a first roll having a surface deposited with a large number of particles having sharp pointed portions and a Mohs hardness value of not less than 5 and a second roll having a smooth surface, the first and second rolls being opposite to each other; and rotating the first and second rolls in opposite directions to cause an elongated organic film to pass between the first and second rolls, adjusting a force acting on the elongated organic film passing between the first and second rolls to be uniform on the entire film surface which is brought into contact with each of the first and second rolls, and causing the sharp pointed portions of the large number of particles deposited on the surface of the first roll to protrude into the elongated organic film so as to form a large number of non-through pores in the elongated organic film.

The first roll has a structure in which a large number of particles having sharp pointed portions and a Mohs hardness value of 5 or more are bonded by an organic or inorganic binder on the outer surface of the metal roll body. Examples of the particle having a Mohs hardness value of 5 or more are a carbide alloy particle (e.g., tungsten carbide), a silicon carbide particle, a boron carbide particle, a sapphire particle, a cubic boron nitride (CBN) particle, or a natural or synthetic diamond particle. Especially, a synthetic diamond particle having a large hardness value or strength is preferable. As the particles, particles having an average particle diameter of 5 to 350 µm and a particle diameter variation of 5% or less are preferably used. Since the non-through pores are to be formed in a film at a density of 500 to 200,000 pores/cm$^2$, the large number of particles are preferably deposited on the surface of the roll body at an area ratio of 50% or more.

As the second roll, for example, one of the following rolls may be used: an iron roll, an iron-based alloy roll, an iron roll whose surface is Ni- or Cr-plated, a stainless steel roll, or a metal roll whose surface is covered with a polymer resin layer. Any resin can be used as the polymer resin. Especially, an urethane resin, silicone rubber, or fluorine-based rubber having a good cushioning effect on an elongated organic film is preferably used.

The non-through pores are formed in the elongated organic film by adjusting a force acting on the elongated organic film passing between the first and second rolls.

According to the present invention, there is also provided a gas permeability control film comprising an organic film in which a large number of non-through pores are formed.

The examples of the organic film are the same as described with reference to the porous film. In particular, a polyolefin film such as a polyethylene film or a polypropylene film (including a biaxially stretched polypropylene film), a polyethylene terephthalate film, and a multilayered film of a polyolefin film and a polyethylene terephthalate film.

The organic film preferably has a thickness falling within the range of 2 μm to 100 μm. When the large number of non-through pores are formed in an organic film having a thickness falling within the above range, the oxygen and carbon dioxide gas permeation amounts can be appropriately controlled.

The average opening width of the non-through pores formed in the organic film can be arbitrarily selected in the range of 0.5 to 150 μm in accordance with application purposes of the gas permeability control film. The opening widths of the large number of non-through pores are preferably uniform.

The number of non-through pores formed in the organic film can be arbitrarily selected in the range of 500 to 200,000 pores/cm$^2$ in accordance with the opening widths of the non-through pores and the application purposes of the gas permeability control film. The large number of non-through pores are preferably uniformly dispersed in the organic film.

The average thickness of the remaining thin film portions of the organic film which are located at the bottom portions of the non-through pores is preferably arbitrarily selected in the range of 10 μm or less in accordance with the application purposes of the gas permeability control film.

According to the present invention, there is also provided a water vapor permeability control film comprising an organic film in which a large number of non-through pores are formed.

The organic film is the same as that described with reference to the porous film. Especially, an elastomer film or a polyurethane film is preferable.

The organic film preferably has a thickness falling within the range of 2 μm to 100 μm. When the large number of non-through pores are formed in an organic film having a thickness falling within the above range, the water vapor permeation amount can be appropriately controlled.

The average opening width of the non-through pores formed in the organic film can be arbitrarily selected in the range of 0.5 to 150 μm in accordance with application purposes of the water vapor permeability control film. The opening widths of the large number of non-through pores are preferably uniform.

The number of non-through pores formed in the organic film can be arbitrarily selected in the range of 500 to 200,000 pores/cm$^2$ in accordance with the opening widths of the non-through pores and the application purposes of the water vapor permeability control film. The large number of non-through pores are preferably uniformly dispersed in the organic film.

The average thickness of the remaining thin film portions of the organic film which are located at the bottom portions of the non-through pores is preferably arbitrarily selected in the range of 10 μm or less in accordance with the application purposes of the water vapor permeability control film.

A porous film according to the present invention has a structure in which a large number of non-through pores are formed in an organic film. The porous film has inherent properties (e.g., transparency, softness, and strength) of the organic film. A large number of projections/recesses are formed on the opening surfaces of the number of non-through pores. This porous film has an excellent anchoring effect for an adhesive layer coated on the surface having the opening of non-through pores. As described above, the porous film can be utilized as a coating film formation base film or a stacking film to be described later.

(1) A resin solution containing a magnetic powder is applied to the opening surfaces of the non-through pores of the porous film to enhance the anchoring effect of the large number of non-through pores of the porous film, thereby coating a magnetic layer having a high adhesion strength with the porous film. The porous film covered with the magnetic layer can be utilized as a magnetic tape. In particular, since the magnetic powder can be embedded in the large number of non-through pores of the porous film, the filling density of the magnetic powder can be increased even if the thickness of the magnetic layer is small. As a result, a thin magnetic tape (e.g., prepayment card) capable of performing high-density recording can be obtained.

(2) An ink is applied to the opening surfaces of the non-through pores of the porous film and is dried, thereby obtaining an ink layer having a high adhesion strength with the porous film due to the anchoring effect of the large number of non-through pores of the porous film. The porous film having this ink layer can be utilized as an ink ribbon. In particular, since the ink can be filled in the large number of non-through pores of the porous film, the coating amount of the ink can be increased even if the thickness of the ink layer is decreased. As a result, a thin ink ribbon capable of excellent recording can be obtained.

(3) When an organic film (first organic film) incompatible with a predetermined adhesive and an organic film (second organic film) compatible with the predetermined adhesive are to be stacked on each other by using the predetermined adhesive, a large number of non-through pores are formed in the first organic film to obtain a porous film. The predetermined adhesive is applied to the side of the porous film having the opening surfaces of the non-through pores, and the second organic film is adhered to this adhesive, thereby stacking the first and second organic films. In this multilayered structure, the adhesive can be properly adhered to the porous film due to the anchoring effect of the large number of non-through pores. On the other hand, the second organic film is compatible with this adhesive. As a result, the first and second organic films can be strongly adhered through the adhesive to obtain a multilayered film.

According to the method for manufacturing the porous film of the present invention, the first roll having a surface deposited with a large number of particles having sharp pointed portions and a Mohs hardness value of 5 or more is arranged to oppose the second roll having a smooth surface.

The first and second rolls are rotated in opposite directions, and an elongated organic film is passed between the first and second rolls. At the same time, the force acting on the elongated organic film passing between the first and second rolls is adjusted to be uniform in the entire surfaces of the film which are brought into contact with the respective rolls. With almost no deterioration in the properties inherent to the elongated organic film, the sharp pointed portions of the large number of particles deposited on the surface of the first roll protrude into the elongated organic film, thereby forming a large number of non-through pores. As a result, the porous film can be manufactured in a mass production line.

Since the gas permeability control film according to the present invention has a structure in which a large number of non-through pores formed in an organic film, water, bacteria, and viruses do not permeate through the remaining thin film portions of the organic film which correspond to the bottom portions of the non-through pores, but only oxygen gas and carbon dioxide gas can permeate, thereby controlling the gas permeation amounts. More specifically, the permeation amounts of oxygen gas and carbon dioxide gas are greatly increased by gas solubility and diffusion caused by the film element at the remaining thin film portions of the organic film. For this reason, when the number of the non-through pores and the thickness of the remaining thin film portions corresponding to the non-through pores are controlled, a gas permeability control film in which the permeation amounts of oxygen gas and carbon dioxide gas are controlled can be obtained. The oxygen gas permeation amount of the gas permeability control film is, for example, $10^3$ to $10^7$ cc/m$^2$·24 hours·25° C. This gas permeability control film can be applied to the following wrapping material.

(1) For example, a gas permeability control film comprising an organic film such as a polyethylene film, a biaxially stretched polypropylene film, a polypropylene film, or a polyethylene terephthalate film in which a large number of non-through pores are formed can be utilized as a fresh fruit and vegetable wrapping material.

More specifically, when a fresh fruit or vegetable is wrapped and sealed by a conventional wrapping material, the oxygen concentration in the wrapping material is decreased and the carbon dioxide gas concentration therein is increased due to a respiration effect of the fruit or vegetable itself. For this reason, the decrease in oxygen amount and the increase in carbon dioxide gas suppress respiration of the fruit or vegetable, thereby maintaining the fruit or vegetable fresh. In this case, gas permeability of the film serving as the element of the wrapping material must satisfy the following conditions. The wrapping material must allow permeation of a minimum amount of oxygen which allows normal respiration of the fruit or vegetable and maintenance of the life of the fruit or vegetable. At the same time, the concentration of carbon dioxide gas produced by respiration should not be excessive.

The gas permeability control film comprising, e.g., a polypropylene film in which a large number of non-through pores are formed can greatly increase the permeation amounts of oxygen gas and carbon dioxide gas and can prevent permeation of water and viruses, as described above. In addition, carbon dioxide gas produced by respiration of the fruit or vegetable can permeate the film to prevent an excessive concentration of carbon dioxide gas. As a result, the wrapping material has an excellent fresh fruit and vegetable maintenance effect.

(2) A gas permeability control film which comprises a multilayered film of a first film, e.g., a polyethylene or polypropylene film and a second film, e.g., a polyethylene terephthalate film, and in which a large number of non-through pores are formed from the second film side to the first film side, can be utilized as a low-cost deoxidant wrapping material. The non-through pores formed in the gas permeability control film are through pores in the second film.

More specifically, a conventional deoxidant wrapping material has a structure in which a large number of through pores are formed in a two-layered film consisting of a polyethylene terephthalate film and a polyethylene film in accordance with a needle punch method or the like, and Japanese paper is stacked on the polyethylene film side of the two-layered film. For this reason, the resultant wrapping material becomes expensive by an amount required for adhesion of the Japanese paper. When a deoxidant is stored in the wrapping material and the wrapping material is stored in a sealed container together with a liquid content, the content permeates inside the wrapping material through the through pores and the Japanese paper. As a result, the deoxidant stored in the wrapping material is undesirably deteriorated.

A deoxidant wrapping material is formed into a bag such that the first film having the remaining thin film portions of the gas permeability control film faces inside. In this wrapping material, external oxygen can permeate through the large number of through pores of the second film, and gas solubility and diffusion inside the wrapping material can be caused by the film element in the remaining thin film portions corresponding to the non-through pores of the first film.

When a deoxidant is stored in the above wrapping material and the wrapping material is stored in a sealed container having a good gas barrier property together with a content such as candies, oxygen in the container permeates through the wrapping material and is absorbed by the deoxidant. As a result, the atmosphere inside the container can be almost free from oxygen. Therefore, quality degradation of the content which is caused by oxidation can be prevented.

Since the wrapping material has a high resistance to water permeability, even a liquid content cannot permeate through the wrapping material, thereby preventing deterioration of the deoxidant inside the wrapping material. As a result, liquid and solid contents can be preserved for a long period of time by preparing only several types of wrapping materials.

(3) Since the gas permeability control film can control the permeation amounts of oxygen gas and carbon dioxide gas by controlling the number of non-through pores and the thickness of the remaining thin film portions, this film can be used as an oxygen gas filter or a carbon dioxide gas filter.

Since the water vapor permeability control film according to the present invention has a structure in which a large number of non-through pores are formed in an organic film, water, bacteria, and viruses do not permeate through the remaining thin film portions of the organic film which correspond to the bottom portions of the non-through pores, but only water vapor can permeate, thereby controlling the water vapor permeation amounts. This water vapor permeability control film can be applied to medical materials such as a base film for a cataplasm.

(1) A water vapor permeability control film comprising an organic film such as an elastomer film in which a large number of non-through pores are formed can be utilized for an expandable cataplasm base film.

The cataplasm is adhered to a skin to achieve an anti-inflammatory effect or a secretion absorption effect. A structure in which a paste-like medicine containing a powder medicine for external application is applied to cloth is known as the conventional cataplasm. In the cataplasm having the above structure, water vapor cannot sufficiently permeate through the cloth. For this reason, when the cataplasm is adhered to the skin before a patient goes to bed, sweat appearing on the skin does not permeate through the cataplasm and left between the skin and the cataplasm to result in discomfort.

The cataplasm obtained by applying a medicine for external application to the water vapor permeability control film has high water vapor permeability. For this reason, the sweat appearing on the skin can permeate through the cataplasm and can be properly evaporated. This cataplasm can be comfortably used even during sleep.

(2) A water vapor permeability control film comprising the elastomer film described in (1) above in which a large number of non-through pores are formed can prevent permeation of water, bacteria and viruses, enhances permeation of water vapor, and has a high expendability. Therefore, the water vapor permeability control film can be utilized as gloves for surgical operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a sectional view showing an elongated porous OPP film manufactured in Example 1.

DETAILED DESCRIPTION OF THE PREFERRED EMBODIMENTS

A preferred embodiment of the present invention will be described in detail below with reference to the accompanying drawings.

Figure 1:
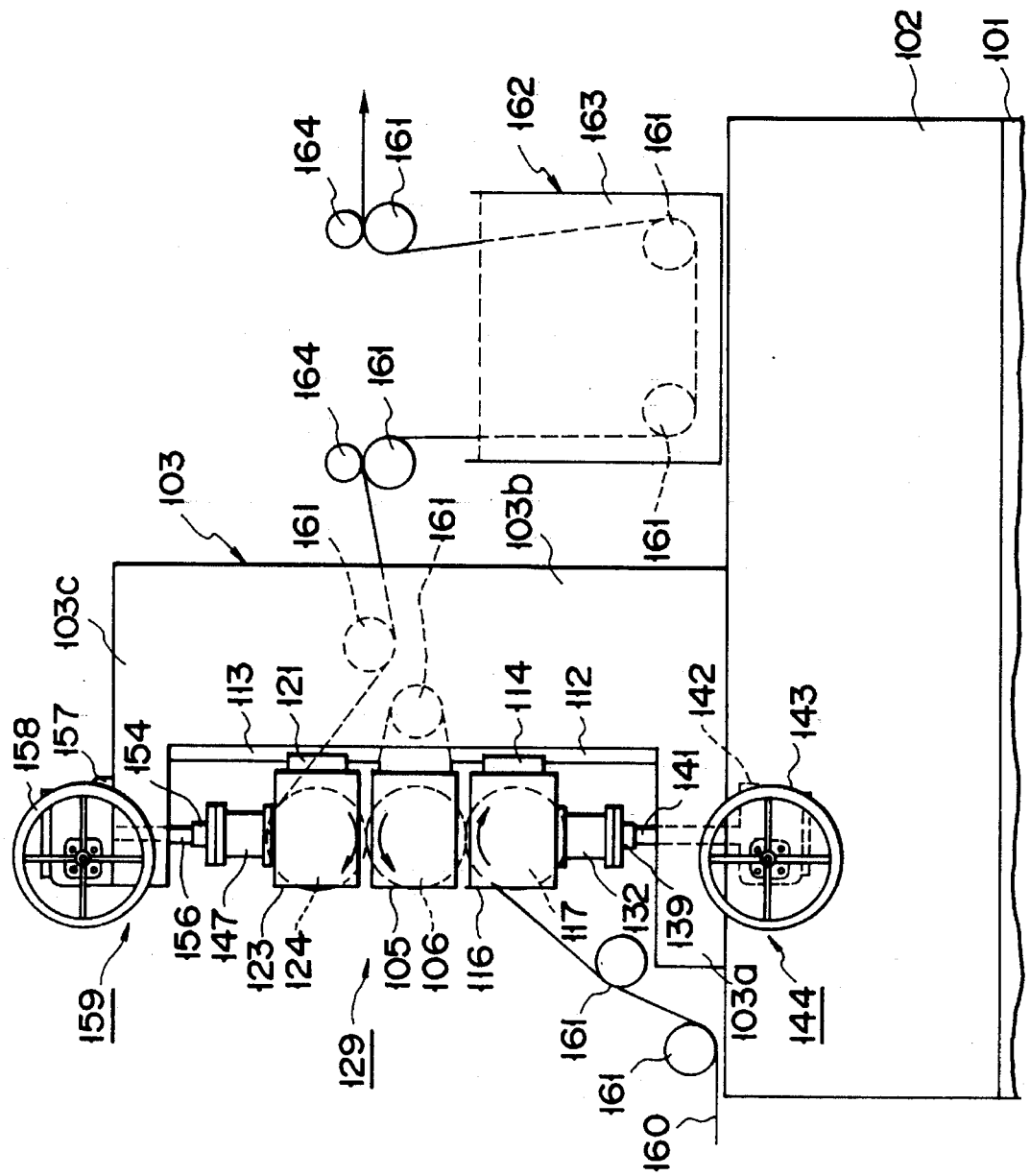
FIG. 1 is a front view showing a porous film manufacturing apparatus used in an embodiment of the present invention.
Figure 2:
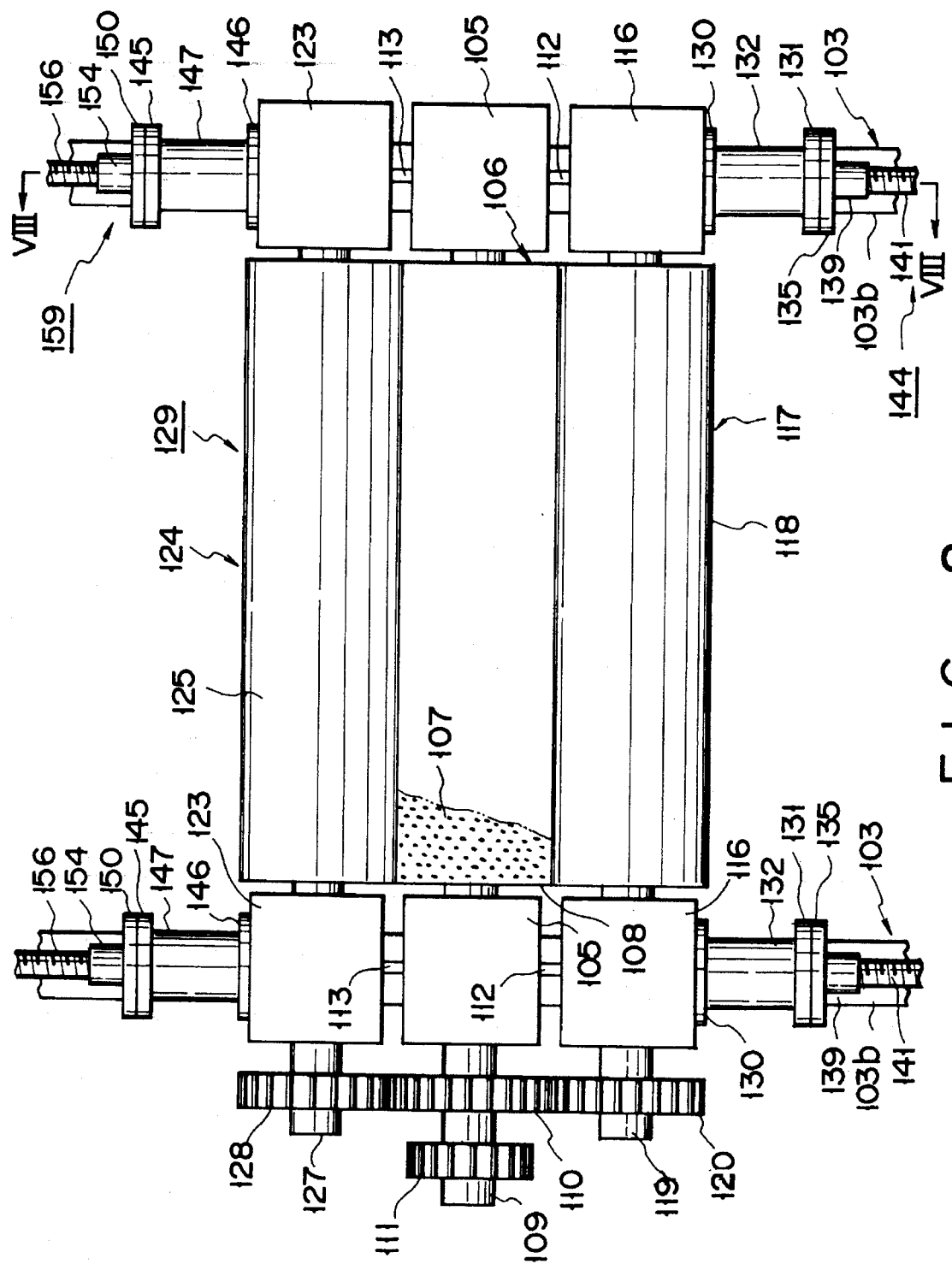
FIG. 2 is a side view showing the main part of the manufacturing apparatus shown in FIG. 1.
Figure 3:
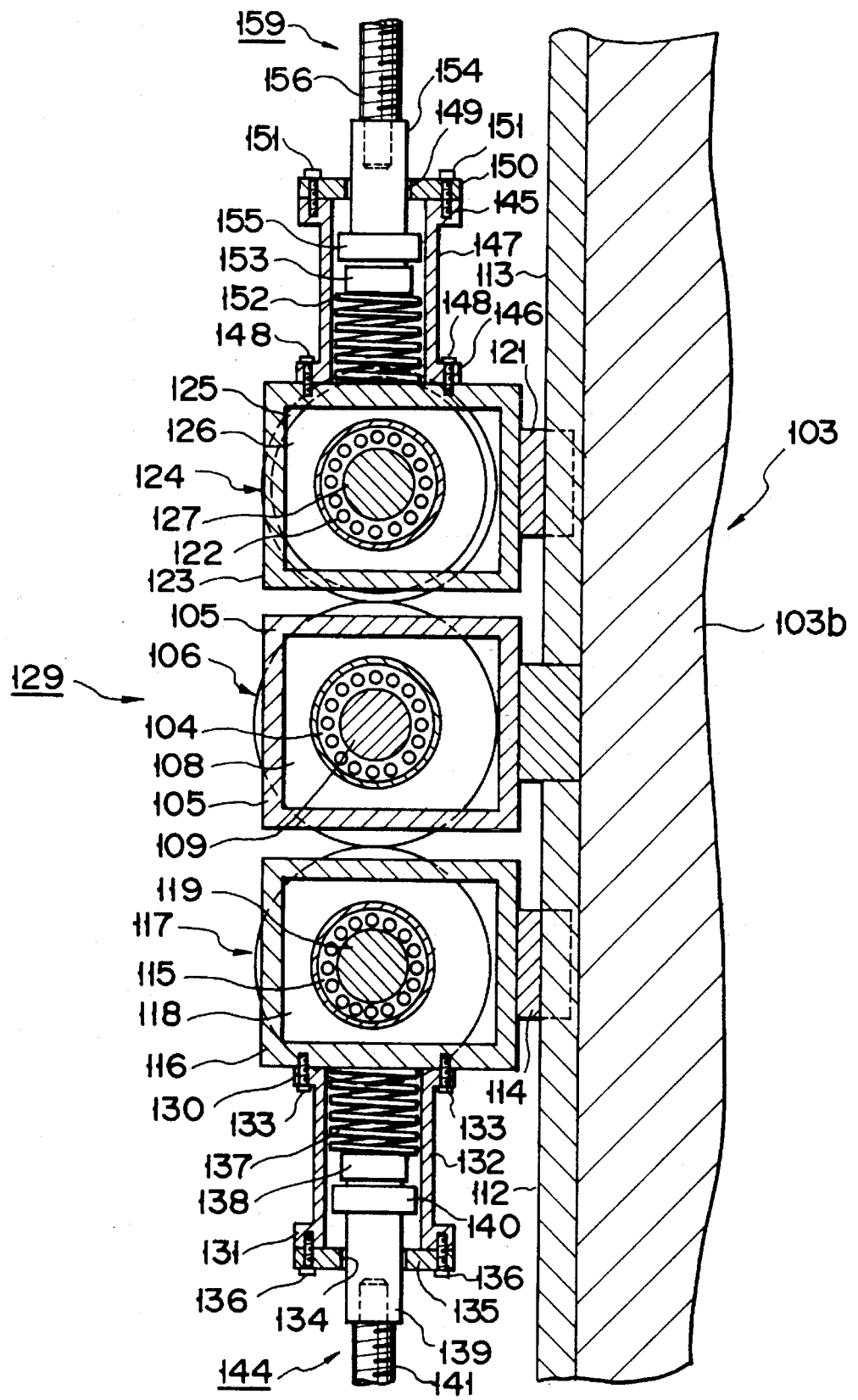
FIG. 3 is a sectional view of the main part along the line III—III in FIG. 2.

FIG. 1 is a front view showing a porous film manufacturing apparatus used in the embodiment of the present invention, FIG. 2 is a side view showing a main part of the manufacturing apparatus in FIG. 1, and FIG. 3 is a sectional view taken along a line III—III in FIG. 2.

Referring to FIGS. 1 to 3, reference numeral 101 denotes a bed. A table 102 is arranged on the upper surface of the bed 101 except for a portion near its right end. Two U-shaped frames 103 are arranged on the table 102 to be spaced apart by a predetermined distance in the direction of width of the table 102. Each frame 103 is constituted by a lower plate 103a, a side plate 103b, and an upper plate 103c. A first box 105 incorporating a bearing 104 is fixed near an intermediate portion of the side plate 103b of each frame 103. A first roll 106 is arranged between the frames 103. As shown in FIG. 2, the first roll 106 consists of an iron roll body 108 and a shaft 109. The roll body 108 is designed such that a large number of particles (e.g., synthetic diamond particles) 107, each having a particle size of 50 to 60 µm, sharp pointed portions, and a Mohs hardness value of 5 or more, are electro-deposited on the surface of the main body at an area ratio of 70% or more. The shaft 109 extends through the center of the main body 108 to protrude from the two end faces of the main body 108. The two protruding end portions of the shaft 109 are axially supported by the bearings 104 in the boxes 105, respectively. A portion of the shaft 109 on one end side (e.g., the left end side) of the first roll 106 extends through the box 105, while the extreme protruding portion of the shaft 109 has a gear 111 meshed with a gear of a driving shaft of a motor (not shown). Therefore, the first roll 106 is rotated, e.g., clockwise, upon driving of the motor. A gear 110 is mounted on a protruding portion of the shaft 109 which is located between the gear 111 and the left side surface of the box 105.

Rails 112 and 113 are formed on the portions of the side plate 103b of each frame 103 which portions are located above and below the corresponding box 105. As shown in FIG. 3, sliders 114 (only one slider is shown) are respectively arranged on the lower rails 112 to be vertically movable. Second boxes 116, each incorporating a bearing 115, are respectively fixed to the sliders 114 so as to be vertically movable along the rails 112. A second roll 117 is arranged between the frames 103 to be located below the first roll 106 so as to oppose the first roll 106. The second roll 117 is constituted by a roll body 118 having a hard surface made of, e.g., stainless steel, and a shaft 119 extending through the main body 118 to protrude from the two end faces of the main body 118. The two protruding end portions of the shaft 119 are axially supported by the bearings 115 in the boxes 116, respectively. A portion of the shaft 119 on one end side (e.g., the left end side) of the second roll 117 extends through the second box 116, while the extreme protruding portion of the shaft 119 is fitted in a gear 120 which is meshed with the gear 110 of the shaft 109 of the first roll 106. With this arrangement, the second roll 117 can be freely moved vertically along the rails 112 through the second boxes 116 and the sliders 114. In addition, when the shaft 109 of the first roll 106 is rotated clockwise by the motor, the shaft 119 having the gear 120 meshed with the gear 110 of the shaft 109 is rotated counterclockwise. As a result, the second roll 117 is rotated counterclockwise.

As shown in FIG. 3, sliders 121 (only one slider is shown) are respectively arranged on the upper rails 113 to be vertically movable. Third boxes 123, each incorporating a bearing 122, are respectively fixed to the sliders 121 so as to be vertically movable along the rails 113. A third roll 124 is arranged between the frames 103 to be located above the first roll 106 so as to oppose the first roll 106. The third roll 124 is constituted by an iron roll body 126 covered with a polymer resin layer 125 made of, e.g., urethane resin, and a shaft 127 extending through the central portion of the main body 126 to protrude from the two end faces of the main body 126. The two protruding end portions of the shaft 127 are axially supported by the bearings 122 in the third boxes 123, respectively. A portion of the shaft 127 on one end side (e.g., the left end side) of the third roll 124 extends through the third box 123, while the extreme protruding portion of the shaft 127 is fitted in a gear 128 which is meshed with the gear 110 of the shaft 109 of the first roll 106. With this arrangement, the third roll 124 can be freely moved vertically along the rails 113 through the third boxes 123 and the sliders 121. In addition, when the shaft 109 of the first roll 106 is rotated clockwise by the motor, the shaft 127 having the gear 128 meshed with the gear 110 of the shaft 109 is rotated counterclockwise. As a result, the third roll 124 is rotated counterclockwise.

A perforating unit 129 comprises the two frames 103, the two first boxes 105, the first roll 106, the two sliders 112, the two sliders 113, the two second boxes 116, the second roll 117, the two third boxes 123, and the third roll 124.

Cylinder members 132, each having upper and lower flanges 130 and 131, are respectively arranged on the lower walls of the two second boxes 116. As shown in FIG. 3, each cylindrical member 132 is fixed to a corresponding one of the second boxes 116 with a plurality of screws 133 threadably engaged with the lower wall of the second box 116 from the upper flange 130. A disk 135 having a hole 134 in its center is mounted on the lower flange 131 of each cylindrical member 132. Each disk 135 is fixed to a corresponding one of the lower flanges 131 with a plurality of screws 136 threadably engaged with the lower flange 131 from the disk 135. A coil spring 137 is housed in each cylindrical member 132 to vertically apply an elastic force. A rod 139 having a pressure sensor 138 attached to its upper end is inserted into each cylindrical member 132 through the hole 134 in the disk 135. The pressure sensors 138 are respectively brought into contact with the lower ends of the coil springs 137 to detect pressures acting on the coil springs 137 upon upward movement of the rods 139. A disk-like guide 140 is attached to a portion of each rod 139 below a corresponding one of the sensors 138 so as to allow smooth vertical movement of the rod 139. A ball screw 141 is inserted in the lower end portion of each rod 139. Each ball screw 141 extends through the lower plate 103a of the frame 103 to protrude into a recessed portion (not shown) of the table 102. Casings (only one casing is shown) 142, each incorporating a threaded engaging plate (not shown), are respectively arranged in the recessed portion. The protruding lower end portions of the ball screws 141 are threadably engaged with the engaging plates in the casings 142, respectively. A worm shaft (not shown) engaging with the protruding lower end portion of the ball screw 141 is horizontally inserted in each casing 142, while a handle (the other handle is not shown) 143 is arranged on one end of each worm shaft. With this arrangement, when the handle 143 is rotated, the ball screw 141 engaged with the worm shaft of the handle 143 is rotated to raise (or lower) the rod 139 in which the ball screw 141 is inserted. In this case, when the rod 139 is moved downward by a predetermined distance or more, the disk-like guide 140 attached to the rod 139 is brought into contact with the inner surface of the disk 135 on the lower portion of the cylindrical member 132, thus lowering the cylindrical member 132 itself. As a result, the second boxes 116 fixed to the upper ends of the cylindrical members 132 are respectively moved downward along the rails 112 through the sliders 114.

A first pressure control means 144 for controlling the pressure acting on a film passing between the first and second rolls 106 and 117 is constituted by the two cylindrical members 132, the two disks 135, the two coil springs 137, the two pressure sensors 138, the two rods 139, the two disk-like guides 140, the two ball screws 141, the two casings 142, the two worm shafts (not shown), and the two handles 143.

Cylinder members 147, each having upper and lower flanges 145 and 146, are respectively arranged on the upper walls of the two third boxes 123. As shown in FIG. 3, each cylindrical member 147 is fixed to a corresponding one of the third boxes 123 with a plurality of screws 148 threadably engaged with the upper wall of the third box 123 from the lower flange 146. A disk 150 having a hole 149 in its center is mounted on the upper flange 145 of each cylindrical member 147. Each disk 150 is fixed to a corresponding one of the upper flanges 145 with a plurality of screws 151 threadably engaged with the upper flange 145 from the disk 150. A coil spring 152 is housed in each cylindrical member 147 to vertically apply an elastic force. The lower end of each coil spring 152 is in contact with the upper wall of the corresponding third box 123. A rod 154 having a pressure sensor 153 attached to its lower end is inserted into each cylindrical member 147 through the hole 149 in the disk 150. The pressure sensors 153 are respectively brought into contact with the upper ends of the coil springs 152 to detect pressures acting on the coil springs 152 upon downward movement of the rods 154. A disk-like guide 155 is attached to a portion of each rod 154 above a corresponding one of the sensors 153 so as to allow smooth vertical movement of the rod 154. A ball screw 156 is inserted in the upper end portion of each rod 154. Each ball screw 156 extends through the upper plate 103c of the frame 103 to protrude above the upper plate 103c. Casings (only one casing is shown) 157, each incorporating a threaded engaging plate (not shown), are respectively arranged on the upper surface of the upper plate 103c of the frame 103. The protruding upper end portions of the ball screws 156 are threadably engaged with the engaging plates in the casings 157, respectively. A worm shaft (not shown) engaging with the protruding upper end portion of the ball screw 156 is horizontally inserted in each casing 142, while a handle (the other handle is not shown) 158 is arranged on one end of each worm shaft. With this arrangement, when the handle 158 is rotated, the ball screw 156 engaged with the worm shaft of the handle 158 is rotated to lower (or raise) the rod 154 in which the ball screw 156 is inserted. In this case, when the rod 154 is moved upward by a predetermined distance or more, the disk-like guide 155 attached to the rod 154 is brought into contact with the inner surface of the disk 150 on the upper portion of the cylindrical member 147, thus raising the cylindrical member 147 itself. As a result, the third boxes 123 fixed to the lower ends of the cylindrical members 147 are respectively moved upward along the rails 113 through the sliders 121.

A second pressure control means 159 for controlling the pressure acting on a film passing between the first and third rolls 106 and 124 is constituted by the two cylindrical members 147, the two disks 150, the two coil springs 152, the two pressure sensors 153, the two rods 154, the two disk-like guides 155, the two ball screws 156, the two casings 157, the two worm shafts (not shown), and the two handles 158.

A winding roll (not shown) for an elongated film is arranged in front of the perforating unit 129. An elongated film 160 is fed from the winding roll to a position between the first and second rolls 106 and 117 and a position between the first and third rolls 106 and 124 of the unit 129 through two feed rolls 161. A destaticizing means 162 is arranged at the outlet of the unit 129. The destaticizing means 129 is constituted by a vessel 163, arranged on the table 102, in which distilled water is stored, and an ultrasonic wave generating member (not shown) for applying ultrasonic waves on the distilled water. Five feed rolls 161 for conveying the elongated film 160 passing between the first and third rolls 106 and 124 are arranged between the unit 129 and the destaticizing means 162, in the vessel 163, and at the outlet of the vessel 163, respectively. Note that abutment rolls 164 are respectively arranged in contact with the two feed rolls 161 located at the inlet and outlet of the vessel 163. A plurality of hot air blasting members (not shown) and a take-up roll (not shown) are sequentially arranged at the outlet of the destaticizing means 162.

EXAMPLE 1

A method of manufacturing a porous OPP film by perforating an elongated film consisting of 20-fm thick biaxially stretched polypropylene (OPP) between the first and third rolls 106 and 124 of the perforating unit 129 in the porous film manufacturing apparatus having the arrangement described above will be described with reference to FIGS. 1 to 3 and FIG. 4.

Figure 4:
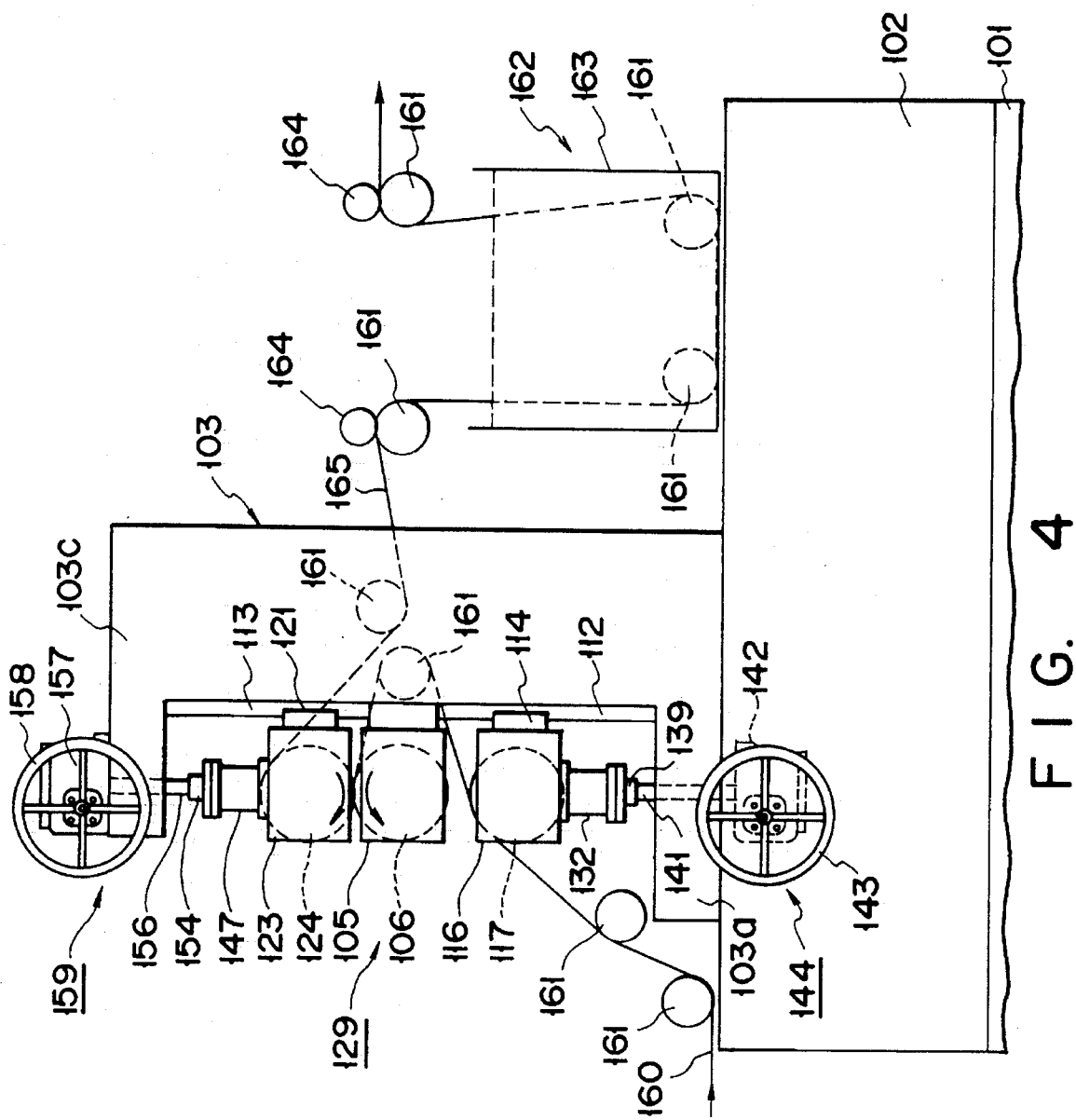
FIG. 4 is a front view for explaining a manufacturing process of Example 1.

When the two handles 143 of the first pressure control means 144 are rotated, e.g., counterclockwise, the second boxes 116 of the perforating unit 129 which are connected to the upper ends of the cylindrical members 132 are moved downward by the sliders 114 along the rails 112 of the frames 103. The second roll 117 supported by the bearings 115 of the second boxes 116 is sufficiently spaced apart from the first roll 106 located above the second roll 117. In addition, when the two handles 158 of the second pressure control means 159 are rotated, e.g., clockwise, the third boxes 123 connected to the lower ends of the cylindrical members 147 are moved upward by the sliders 121 along the rails 113 of the frames 103. The third roll 124 supported by the bearings 122 arranged in the third boxes 123 is sufficiently spaced apart from the first roll 106 located below the third roll 124. In this state, the elongated film 160 consisting of 20-fm thick PET is fed from a winding roll (not shown) and is fed between the first and second rolls 106 and 117 and between the first and third rolls 106 and 124 of the unit 129 by the two feed rolls 161. The elongated film 160 is then passed through the vessel 163 of the destaticizing means 162 by the four feed rolls 161, so that the leading end of the elongated film 160 is wound around a take-up roll (not shown). In the above process, in order to cause the elongated film 160 to pass between the first and second rolls 106 and 117, the elongated film 160 is not brought into contact with the surface of the first roll 106, as shown in FIG. 4.

After the leading end of the elongated film 160 is wound around the take-up roll, the two handles 158 of the second pressure control means 159 are rotated counterclockwise to move the third boxes 123 connected to the lower ends of the cylindrical members 147 downward by the sliders 121 along the rails 113 of the frames 103. The third roll 124 supported by the bearings 122 of the third boxes 123 is brought into contact with the first roll 106 located below the third roll 124. In addition, the handles 158 are rotated in the same direction as described above to cause the sensors 153 at the lower ends of the rods 154 to compress the coil springs 152, respectively. Upon compression of the coil springs 152, forces are applied to the upper walls of the third boxes 123. The force acting between the first roll 106 and the third roll 124 supported by the bearings 122 in the third boxes 123 is increased. In this case, the force (compression force) acting between the third roll 124 and the first roll 106 is detected by each pressure sensor 153. Clockwise or counterclockwise rotation of each handle 158 is controlled to control the force acting on the elongated film 160 located between the third and first rolls 124 and 106. Pressure control for the unit 129 by the second pressure control means 159 allows to apply a uniform force (e.g., 200 kg/m) to the entire surface of the elongated film 160 located between the third and first rolls 124 and 106 along its entire width, thereby completing preparation for a perforating operation.

Upon completion of the preparation for a perforating operation, an ultrasonic wave is applied from an ultrasonic wave generating member (not shown) to the distilled water stored in the vessel 163 in the destaticizing means 162. Subsequently, the take-up roll is rotated and at the same time, the driving shaft of a motor (not shown) is rotated. Transmission of rotation of the gear of the driving shaft and the gear 111 of the shaft 109 of the first roll 106 causes clockwise rotation of the first roll 106. When the first roll 106 is rotated, transmission of rotation of the gear 110 of the shaft 109 and the gear 128 of the shaft 127 of the third roll 124 causes counterclockwise rotation of the third roll 124. In this case, since the second roll 117 is sufficiently spaced apart from the first roll 106 above the first roll 106, the gear 120 of the shaft 119 of the second roll 117 is released from the gear 110 of the shaft 109 of the first roll 106, and the second roll 117 is not driven by the motor. That is, the second roll 117 can be freely rotated. When the first and third rolls 106 and 124 are rotated as described above, the elongated film 160 passing between the rolls 106 and 124 is perforated.

As shown in FIG. 2, the first roll 106 has a structure comprising the roll body 108 designed such that a large number of particles (e.g., synthetic diamond particles) 107, each having a particle size of 50 to 60 µm and sharp pointed portions, are electro-deposited on the surface of the main body at an area ratio of 70% or more. At the same time, the third roll 124 has a structure comprising the roll body 126, the surface of which is covered with the polymer resin layer 125 made of, e.g., urethane resin. In addition, by the pressure control for the unit 129 by the second pressure control means 159, a uniform force is applied to the entire contact surface of the elongated film 160 while the elongated film 160 passes between the first and third rolls 106 and 124. For this reason, when the elongated film 160 consisting of OPP passes between the first and third rolls 106 and 124, the force acting on the film 160 by the sharp pointed portions of the large number of synthetic diamond particles 107 on the surface of the first roll 106 is relaxed by the polymer resin layer 125. Therefore, non-through pores are uniformly formed without degrading the inherent properties of the OPP film.

An elongated porous OPP film 165 perforated by the unit 129 passes and is fed through the vessel 163 in the destaticizing means 162 by the five feed rolls 161 and the two abutment rolls 164. Since the operation for perforating the elongated porous OPP film 165 by the unit 129 is mainly performed by friction of the first and second rolls 106 and 117, a large amount of electrostatic charge is generated on the surface of the elongated porous OPP film 165 upon the perforation operation, and ambient dust is attracted to the surface of the film 165. The elongated porous OPP film 165 perforated by the unit 129 is caused to pass through the vessel 163 which stores distilled water in the destaticizing means 162, and at the same time, an ultrasonic wave is applied to the distilled water by an ultrasonic wave generating member (not shown), thereby removing the dust from the surface of the elongated porous OPP film 165. Subsequently, the elongated porous OPP film 165 is caused to pass through a plurality of hot air blasting members (not shown) to evaporate the water from the surface of the film. The dried film is then taken up by a take-up roll (not shown).

The elongated porous OPP film 165 manufactured by the method of Example 1 had the following properties. Non-through pores 166 having a substantially V-shaped cross section and an average opening width (W) of about 20 μm were uniformly formed in the elongated film 160 consisting of 20-μm thick OPP at a density of 10,000 pores/cm², as shown in FIG. 5. The average thickness of remaining thin film portions 167 of the elongated film 160 which were located at the bottom portion of the non-through pores 166 was about 5 μm.

EXAMPLE 2 & 3

Two different elongated porous OPP films having uniform non-through pores having an average opening width value of about 20 μm at a density of 10,000 pores/cm² were manufactured following the same method as in Example 1 except that forces applied to the elongated films consisting of OPP passing between the first and third rolls 106 and 124 were set to be 500 kg/m and 50 kg/m, respectively. The average thickness of remaining thin film portions of the elongated porous OPP film obtained at the force of 500 kg/m was about 2 μm, while the average thickness of remaining thin film portions of the elongated porous OPP film obtained at the force of 50 kg/m was about 10 μm.

The oxygen gas permeation amounts and carbon dioxide gas permeation amounts of the elongated porous OPP films obtained in Examples 1 to 3 were measured. Results are shown in Table 1. Note that the average thicknesses of the remaining thin film portions of the elongated porous OPP films are also listed in Table 1.

TABLE 1

|  | Average Thickness of Remaining Thin Film Portion (μm) | Oxygen Gas Permeation Amount 1* | Carbon Dioxide Gas permeation Amount 2* |
|---|---|---|---|
| Example 1 | About 5 | $1.0 \times 10^4$ to $2.0 \times 10^4$ | $2.0 \times 10^4$ to $3.0 \times 10^4$ |
| Example 2 | About 2 | $1.0 \times 10^5$ to $2.0 \times 10^5$ | $1.0 \times 10^5$ to $3.0 \times 10^5$ |
| Example 3 | About 10 | $2.0 \times 10^3$ | $6.0 \times 10^3$ to $7.0 \times 10^3$ |

The unit of the oxygen gas permeation amount 1* is cc/m² · 24 hours · 25°C.
The unit of the carbon dioxide gas permeation amount 2* is cc/m² · 24 hours · 25° C.

As is apparent from Table 1, the thickness of the remaining thin film portions corresponding to the non-through pores can be adjusted to control the oxygen gas permeation amount and the carbon dioxide permeation amount.

The porous OPP film of Example 1 was used as a fresh fruit and vegetable wrapping material, a bundle of spinach was stored in this wrapping material, and the opening of the wrapping material was closed. As a comparative example, a similar bundle of spinach was stored in a conventional OPP film wrapping material, and the opening of the wrapping material was closed. The wrapping materials which stored the bundles of spinach and were closed were left at room temperature for a week, and the states of spinach were observed. As a result, the spinach stored in the wrapping material of the comparative example was almost changed to yellow and was in a state immediately before being rotten. To the contrary, the spinach stored in the wrapping material consisting of the porous OPP film of Example 1 remained greenish which was the color before it was stored in the wrapping material.

EXAMPLE 4

A perforating operation was performed following the procedures as in Example 1, except that an elongated multilayered film obtained by stacking a 20-μm thick polyethylene (PE) film and a 12-μm thick polyethylene terephthalate (PET) film through an adhesive was used as an elongated film, that the PET film was passed between the first and third rolls 106 and 124 so that the PET film was located on the side of the first roll, and that the force applied to the multilayered elongated film was set to be 500 kg/m. As a result, uniform non-through pores having an average opening width value of about 20 μm were formed from the PET film side to the PE film side at a density of about 10,000 pores/cm², and the average thickness of the remaining thin film portions corresponding to the non-through pores was about 4 μm.

The elongated porous multilayered film had an oxygen gas permeation amount of $1 \times 10^7$ cc/m²·24 hours·25° C. This porous multilayered film having this oxygen gas permeation amount could be utilized as a wrapping material for a deoxidant.

EXAMPLE 5

A perforation operation was performed following the same procedures as in Example 1, except that a 30-μm thick elastomer film was used as an elongated film, and that the first roll had an iron roll body designed such that a large number of synthetic diamond particles, each having a particle size of 60 to 75 μm and sharp pointed portions, were electro-deposited on the surface of the main body. As a result, uniform non-through pores having an average opening width of about 30 μm were formed at a density of about 10,000 pores/cm², and the average thickness of the remaining thin film portions corresponding to the non-through pores was about 5 μm in the elongated porous elastomer film.

The water vapor permeation amount of the elongated porous elastomer film obtained in Example 5 was measured to be 1,500 g/m²·24 hours·40° C.·90%RH. The water vapor permeation amount of this film was much larger than a conventional elastomer film having no non-through pores (water vapor permeation amount: 500 g/m²·24 hours·40° C.·90% RH). The porous elastomer film having such a large water vapor permeation amount could be utilized as a medical material such as a base film for an antiperspirant cataplasm.

EXAMPLE 6

A perforation operation was performed following the same procedures as in Example 1, except that a 50-μm thick PET film was used as the elongated film 160, that the first roll 106 had an iron roll body designed such that a large number of synthetic diamond particles, each having a particle size of 30 to 35 μm and sharp pointed portions, were electro-deposited on the surface of the main body, that the third roll 124 was made of stainless steel as in the second roll 117, and that the elongated film 160 was passed between the first and second rolls 106 and 117 and between the first and third rolls 106 and 124 at adjusted pressures. The resultant elongated porous PET film had uniform non-through pores having an average opening width of about 10 μm and an average depth of about 10 μm at a density of about 120,000 pores/cm² by two perforation operations.

The elongated porous PET film obtained in Example 6 had an excellent anchoring effect for an adhesive layer coated on the surface having the opening of non-through pores. As a result, the porous PET film could be utilized as a coating film formation base film such as a magnetic layer containing magnetic particles, and a stacking film.

As described above, according to the present invention, there is provided porous films which have a large number of non-through pores and maintain inherent properties (e.g., transparency, softness, and strength) of organic film materials, and which can be utilized as various types of filters, medical materials, and fresh fruit and vegetable wrapping materials.

According to the present invention, there is also provided a method of easily manufacturing the porous film in a mass production line.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A porous film consisting essentially of a single organic film in which a large number of non-through perforation pores are formed at a density of 500 to 200,000 pores/cm², each pore being open at one surface of the film and having a substantially V-shaped cross section, and said organic film having a thin film portion which is located below the non-through perforation pores and has an average thickness of 10 μm or less.

2. The porous film according to claim 1, wherein the organic film has an overall thickness falling within a range of 2 μm to 100 μm.

3. The porous film according to claim 2, having an oxygen gas permeation within the range of $10^3$ to $10^7$ cc/m²·24 hours·25° C.

4. The porous film according to claim 1, wherein the organic film is a polyolefin film.

5. The porous film according to claim 1, wherein the organic film is an elastomer film.

6. A porous film having a double-layer structure composed of first and second organic films which are dissimilar to each other and stacked one upon the other, said porous film having a large number of non-through perforation pores which penetrate the entire thickness of the first organic film and extend into the second organic film, said no non-through perforation pores formed at a density of 500 to 200,000 pores/cm², each pore being open at one surface of said first organic film, having a substantially V-shaped cross section and extending through said first organic film into said second organic film, and said second organic film having a thin film portion which is located below the non-through perforation pores and has an average thickness of 10 μm or less.

7. The porous film according to claim 6, wherein said first organic film is a polyethylene terephthalate film and said second organic film is a polyethylene film.

8. The porous film according to claim 6, wherein said non-through perforation pores have an average opening width falling within a range of 0.5 to 150 μm.

* * * * *

UNITED STATES PATENT AND TRADEMARK OFFICE
CERTIFICATE OF CORRECTION

PATENT NO. : 5,458,951
DATED : October 17, 1995
INVENTOR(S) : KAGAWA

It is certified that error appears in the above-indentified patent and that said Letters Patent is hereby corrected as shown below:

Column 16, claim 6, delete the word "no".

Signed and Sealed this

Eleventh Day of June, 1996

Attest:

BRUCE LEHMAN

*Attesting Officer*     *Commissioner of Patents and Trademarks*